June 30, 1953     G. L. TURNER ET AL     2,643,784
FORK CONSTRUCTION FOR INDUSTRIAL TRUCKS
Filed June 22, 1949     2 Sheets-Sheet 2

INVENTORS.
ROBERT LAPSLEY
GEORGE L. TURNER
BY
ATTYS.

Patented June 30, 1953

2,643,784

UNITED STATES PATENT OFFICE 2,643,784

FORK CONSTRUCTION FOR INDUSTRIAL TRUCKS

George L. Turner and Robert Lapsley, Buchanan, Mich., assignors to Clark Equipment Company, Buchanan, Mich., a corporation of Michigan Application June 22, 1949, Serial No. 100,684

2 Claims. (Cl. 214—731)

1

Our invention relates to an industrial truck and more particularly to load supporting means, preferably of fork form, for supporting a load to be carried by the truck of a character enabling manipulation of the truck in confined areas.

At the present time in warehouses, it is necessary to maintain the width of aisles in excess of the over-all length of an industrial truck and load supporting means therefor in order that an operator may first position the truck and deposit a pallet supported load carried thereby in a row adjacent the aisle and then withdraw the forks of the truck from under the pallet. The operator of the truck may, when depositing a pallet supported load at the end of a row of stacked goods, manipulate the truck in an aisle of a width less than that indicated, but when removing the truck, the operator must back it away in substantially a straight line before initiating turning in order to enable the ends of the forks to clear the edges of the pallet. Similarly, when maneuvering the truck to pick up a pallet supported load it is necessary to position the truck substantially in a straight line with respect to the pallet in the row before inserting the forks under the pallet. Thus an aisle for enabling convenient manipulation of the truck must be of a width for permitting alignment of the truck with the pallet in the row.

An object of our invention is to provide load supporting means for an industrial truck, preferably in the form of horizontally extending forks pivotally mounted adjacent their heels for permitting pivotal movement of the forks with respect to the truck to enable manipulation of the truck in confined areas.

By providing a truck with load supporting means of the character indicated, it is possible to reduce the required aisle width in storage areas, since for example, in picking up a load at the end of a row the ends of the forks may be positioned to enter the pallet before the truck assumes a position substantially in alignment with the pallet supported load and further enables the truck to be backed away from the pallet supported load when withdrawing its forks from under the pallet a shorter distance than was previously possible, before initiating turning of the truck.

A preferred feature of our invention resides in the provision of load supporting means including a pair of horizontally extending forks rigidly secured adjacent their heels to vertical stub shafts in which rack and pinion means is associated with the stub shafts for rotating the latter and which in turn effects rotation of the forks.

2

Now in order to acquaint those skilled in the art with the manner of constructing and using devices in accordance with our present invention, we shall describe in connection with the accompanying drawings a preferred embodiment of our invention.

Figure 1:
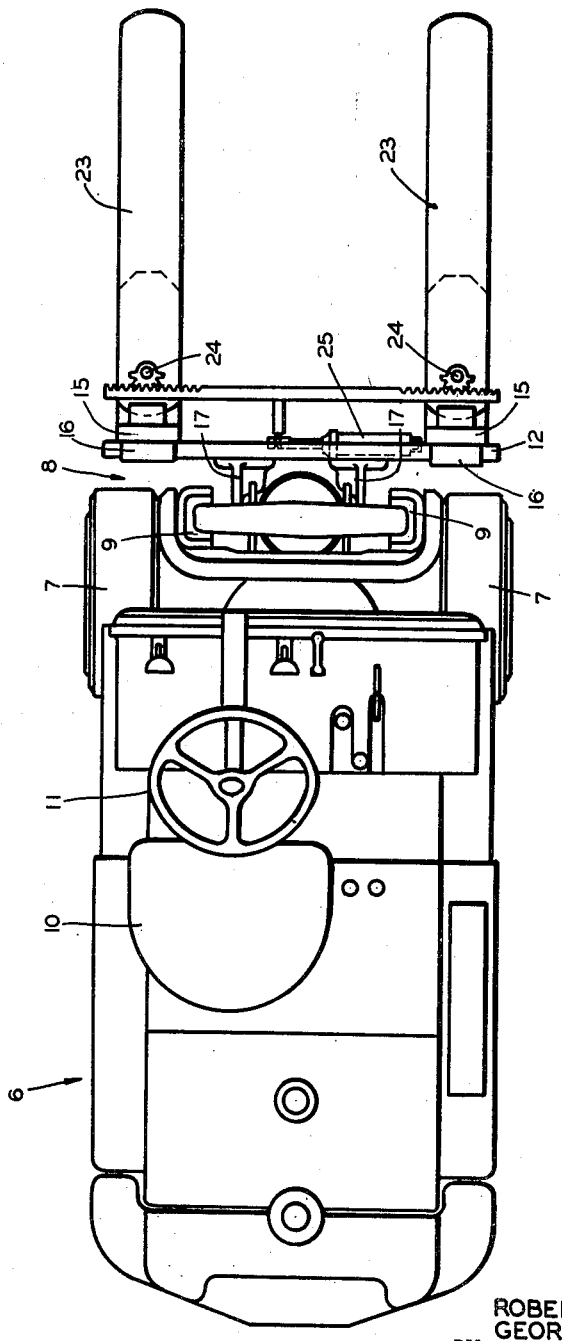
Figure 1 is a plan view of a conventional type of industrial truck with which the load supporting means of our present invention is embodied.
Figure 2:
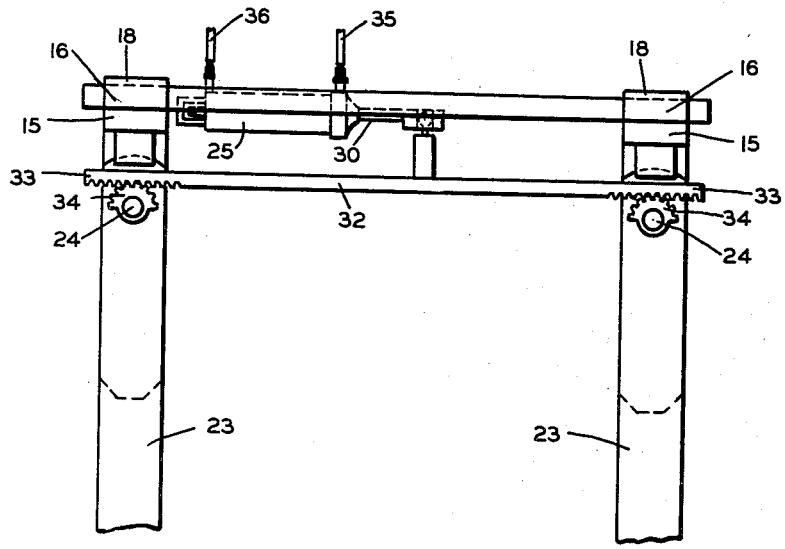
Figure 2 is a partial plan view of the load supporting means of Figure 1.
Figure 3:
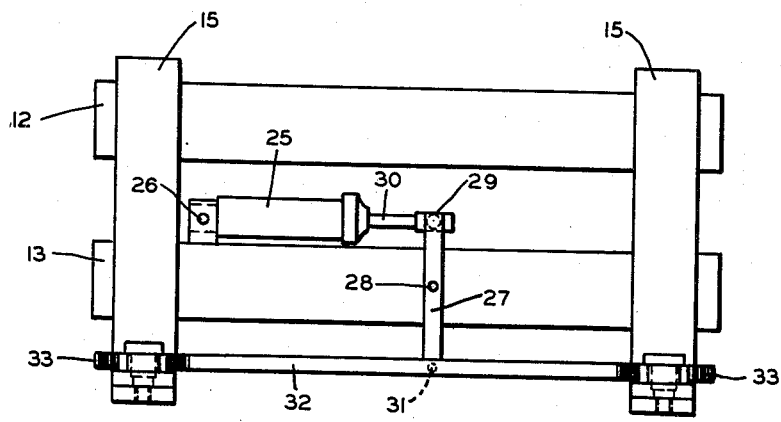
Figure 3 is a partial front elevational view of the load supporting means of Figure 1.

Referring now to Figure 1, there is shown an industrial lift truck, indicated generally by the reference numeral 6, having conventional forward driving wheels 7. The truck adjacent its forward end, is provided with a vertical mast 8 comprising vertically extending spaced apart channel members 9 which are adapted to be actuated by conventional hydraulic actuating means disposed between the confines of the members 9 and controlled by known remote control means.

The driver's seat 10 is disposed adjacent the steering wheel 11. The truck shown is of known construction and is provided with a power plant, such as an internal combustion engine together with standard clutch and brake means, and pump means for developing fluid under pressure which is used to actuate the aforementioned and other hydraulic actuating means to be described.

The telescopic mast 8 is provided adjacent its forward end with carriage means comprising a pair of transversely extending plate members 12 and 13 secured to brackets 17, which are mounted in a known manner to the mast. The plate member 12, provides, in part, for the support of a pair of substantially L-shaped fork supporting frames 15. The fork supporting frames 15 are mounted in spaced apart relation on the carriage means and since they are of identical construction it is believed a description of one of them will be sufficient to disclose the features of our invention to those skilled in the art.

To the top portion of the fork supporting frame 15 there is secured, as by welding or other suitable means, a hook member 16, having a tongue portion 18 facing downwardly for engaging the upper portion of the upper plate member 12. The lower plate member 13, acts as a brace against which the fork supporting frame 15 may bear, and which may receive suitable fastening means for securing the fork supporting frame against movement transversely of the forward end of the truck. The construction described provides for mounting the fork supporting frame 15 at either end of upper plate member 12, with the fork supporting frame 15 then being slidable along plate 12 to a desired position.

A fork 23 is rigidly secured to each of the vertical shafts 24 which are rotatably mounted in a suitable manner in the horizontally projecting legs of the fork supporting frames 15.

A hydraulic piston and cylinder assembly 25, for effecting pivotal movement of forks 23, is disposed between the fork supporting frames 15 and is pivotally connected at 26, by means of a clevis, to the upper edge of the bottom plate member 13 of the carriage. A lever 27 is pivotally mounted, intermediate of its ends, by means of a bolt 28, to the bottom plate member 13. The lever 27, at its upper end, is pivotally connected by a ball and socket joint 29 to the outer end of the piston rod 30 and at its lower end is pivotally connected by means of a ball and socket joint 31 to a transverse shifter bar 32 disposed below the lower portion of the bottom plate 13.

Each end of the rack bar 32 is provided with a rack portion 33 which is adapted to engage pinion segments 34 rigidly secured one to each of the upper portions of the vertical shafts 24. Suitable fluid lines 35 and 36 have connection with opposite end portions of the cylinder of the hydraulic actuating means 25 and admission thereto of fluid under pressure, from a source developed by pump means provided for the truck, is adapted to be controlled by conventional valve means under the control of the operator of the truck.

When desiring to shift the forks 23 to the left of the truck, as viewed from the front, the operator actuates the control valve means, which preferably is located on the truck adjacent the driver's seat, to supply fluid under pressure through hose 35 to the actuating assembly 25 forcing the piston rod 30 inwardly of the actuating assembly. When the piston rod 30 moves inwardly of the actuating assembly 25, the lever 27 is rotated counterclockwise about the pivot point 28, looking at it from the front of the truck. This shifts the shifter bar 32 to the right so that the forks 37 are caused to be rotated about the pivots 24 with the toes of the forks moving to the left of the truck.

In order to pivot the forks 23 to the right of the truck, fluid under pressure is admitted to hose 36 and hose 35 is bled which effects rotation of the lever 27 in a clockwise direction about the pivot point 28 as viewed from the front of the truck. The shifter bar 32 is thus caused to be moved to the left of the truck, which, in turn, effects rotation of the forks 23 about the axis 24 with the toes of the fork moving to the right.

In the operation of the device of our present invention, the truck 6 may be driven down an aisle along a row of goods stacked upon pallets. The truck 6 is stopped adjacent the pallet which is to be picked up and the forks 23 are lowered by means of the load supporting carriage until they are low enough to be disposed beneath the pallet. The truck is then driven slowly forward while the forks 23 are simultaneously rotated in the manner hereinbefore described in the direction of the pallet to be engaged. The forks are shifted in an amount required that will enable the toes of the forks to clear the edges of the pallet. This permits the forks to be inserted beneath the pallet without first aligning the truck in substantially a straight line with respect to the pallet. As the forks 23 begin to enter beneath the pallet supported load, the truck is turned and maneuvered into a position in alignment with the pallet while the forks 23 are simultaneously rotated back to their normal positions shown in Figure 1. At the completion of the aforedescribed operation, the forks are disposed in a proper load engaging position beneath the pallet.

Thereupon, the forks 23, by means of the load supporting carriage, may be elevated within the mast assembly 8 thereby raising the pallet supported load from the ground. At this point, the truck may be backed away and turned toward the lengthwise axis of the aisle while the forks 23 are simultaneously rotated. The ability to rotate the forks selectively laterally in either direction, enables manipulation of the truck with a minimum turning radius in either picking up or depositing the load. In depositing the load, the steps outlined above are followed in a reverse order.

Now, while we have shown and described what we believe to be a preferred embodiment of our present invention, it will be understood that various modifications and rearrangements may be made therein without departing from the spirit and scope of our invention.

We claim:

1. An industrial truck having a vertically extending mast and a carriage including a pair of upper and lower plate members extending transversely of the truck, load supporting means therefor comprising fork supporting frames adapted to be secured to said plate members at either end thereof, said frames comprising vertically and horizontally extending legs, vertical stub shafts pivotally mounted on the horizontally extending legs of said fork supporting frames, forks rigidly secured to stub shafts, pinion means carried by said stub shafts, a lever disposed centrally of the fork supporting frames, a hydraulic actuating assembly pivotally secured at its one end to said lower plate member and at its other end to the upper end of said lever, said lever being pivotally secured intermediate its ends to said lower plate member, a shifter bar pivotally secured intermediate its ends to the lower end of said lever, rack means at the opposite ends of said shifter bar, and said rack means being adapted to engage with said pinion means to effect rotation of the same and of said forks.

2. An industrial truck having a vertically extending mast and a carriage including a pair of upper and lower plate members extending transversely of the truck, load supporting means therefor comprising a pair of fork supporting frames adapted to be secured to said plate members at either end thereof, said frames comprising vertically and horizontally forwardly extending legs, a vertical stub shaft pivotally mounted in the horizontally forwardly extending leg of each of said fork supporting frames, horizontal forwardly extending forks rigidly secured adjacent their heel portions one to each of said stub shafts, pinion means secured to said stub shafts, a vertically extending lever disposed centrally of the fork supporting frames, said lever being pivotally secured intermediate its ends to said lower plate member about an axis extending longitudinally of the truck, a hydraulic actuating assembly pivotally secured at its one end to said lower plate member and at its other end to the upper end of said lever, said hydraulic actuating assembly being remotely controllable by an operator seated on the truck, a shifter bar pivotally secured intermediate its end to the lower end of said lever, said shifter bar extending transversely of the truck, rack means at the opposite ends of said shifter bar, and said rack means being adapted to engage with said pinion means to effect rotation of the same together with said forks.

GEORGE L. TURNER.
ROBERT LAPSLEY.

References Cited in the file of this patent

UNITED STATES PATENTS

| Number | Name | Date |
|---|---|---|
| 1,417,013 | Andrews | May 23, 1922 |
| 1,457,639 | Straight | June 5, 1923 |
| 1,884,907 | Stoner | Oct. 25, 1932 |
| 2,234,851 | Asper | Mar. 11, 1941 |
| 2,271,624 | Cochran | Feb. 3, 1942 |
| 2,410,373 | Westervelt, Jr. | Oct. 29, 1946 |
| 2,477,167 | Bliss | July 26, 1949 |
| 2,538,505 | Carter | Jan. 16, 1951 |